Jan. 17, 1928.　　　　　　　　　　　　　　　　　　1,656,873
R. W. SNYDER
CEMENTING DEVICE
Filed May 28, 1925　　　　　　　　2 Sheets-Sheet 1

INVENTOR
Robert W. Snyder,
BY
ATTORNEY

Jan. 17, 1928.  1,656,873

R. W. SNYDER

CEMENTING DEVICE

Filed May 28, 1925    2 Sheets-Sheet 2

INVENTOR
Robert W. Snyder,
BY
ATTORNEY

Patented Jan. 17, 1928.

1,656,873

UNITED STATES PATENT OFFICE.

ROBERT W. SNYDER, OF AKRON, OHIO, ASSIGNOR TO THE GOODYEAR TIRE & RUBBER COMPANY, OF AKRON, OHIO, A CORPORATION OF OHIO.

CEMENTING DEVICE.

Application filed May 28, 1925. Serial No. 33,455.

My invention relates to a method of and machine for treating rubberized fabric such as commonly utilized in manufacturing beads for pneumatic tires.

More particularly, however, my invention is directed to a new method and device for applying a cementing fluid to bead wrap before it is cut into strips.

In a copending application Serial No. 54,229 there is disclosed a machine for unwinding rolls of rubberized fabric. It is there set forth that a fabric material which has been impregnated with an unvulcanized rubber composition must be protected by disposing between adjacent layers or convolutions thereof a material which has relatively non-adhesive properties. The invention provided a machine for removing such a protective material and conducting the free rubberized product to a bias cutter.

Where the product from the cutter is utilized in wrapping beads, the end of the several strips are joined in series and wound in rolls. Before this can be accomplished successfully, however, one end of the individual strips must be coated with a suitable cementing fluid in order to produce a satisfactory union. In the past it has been necessary for a workman to apply a cement mixture to the end thereof by means of a suitable device, such for example as a paint brush. It is the object of this invention to provide a machine to effect this operation and thereby secure a more uniform product and obviate the necessity of manual labor.

Figure 1:
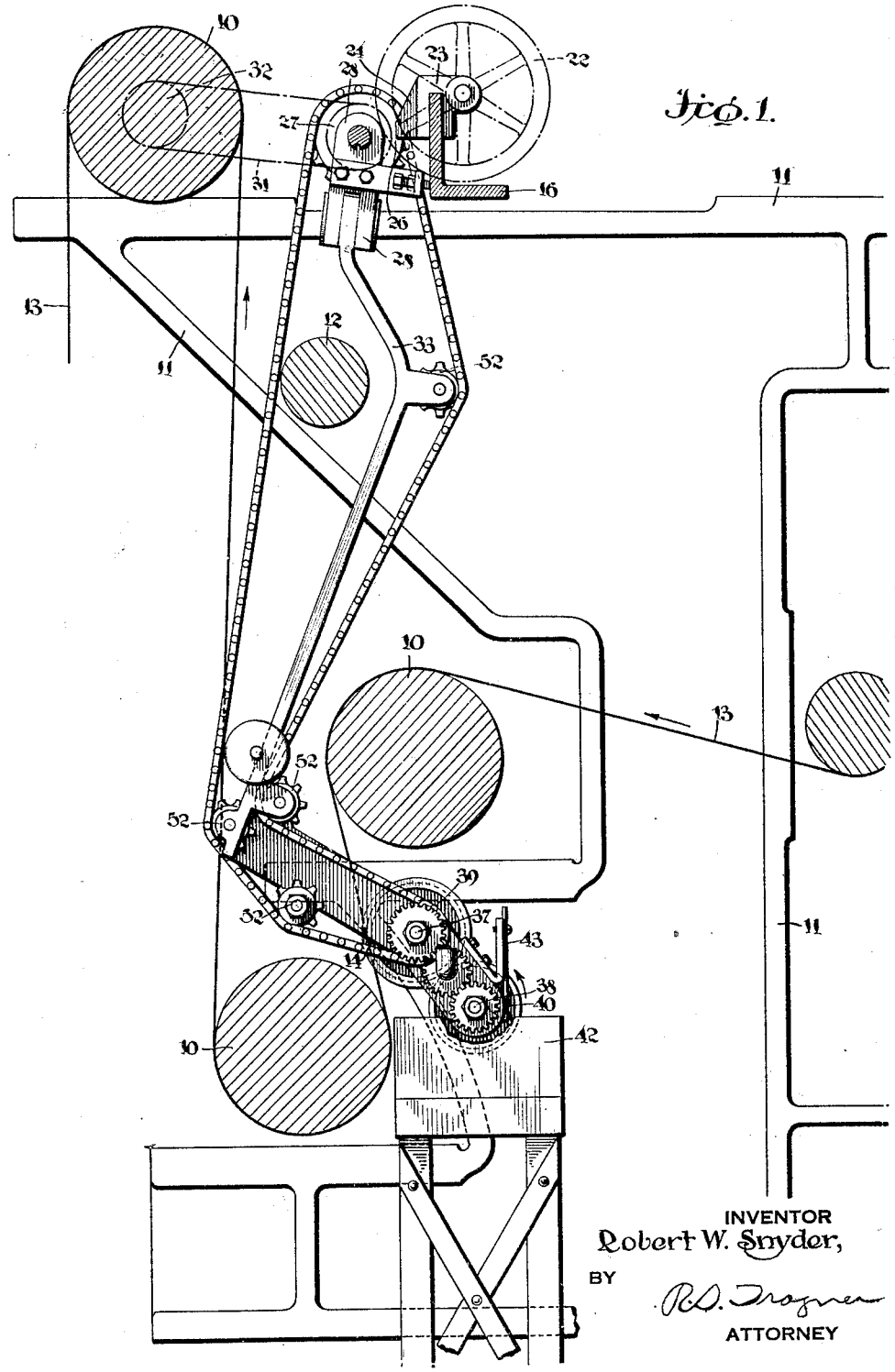
Figure 2:
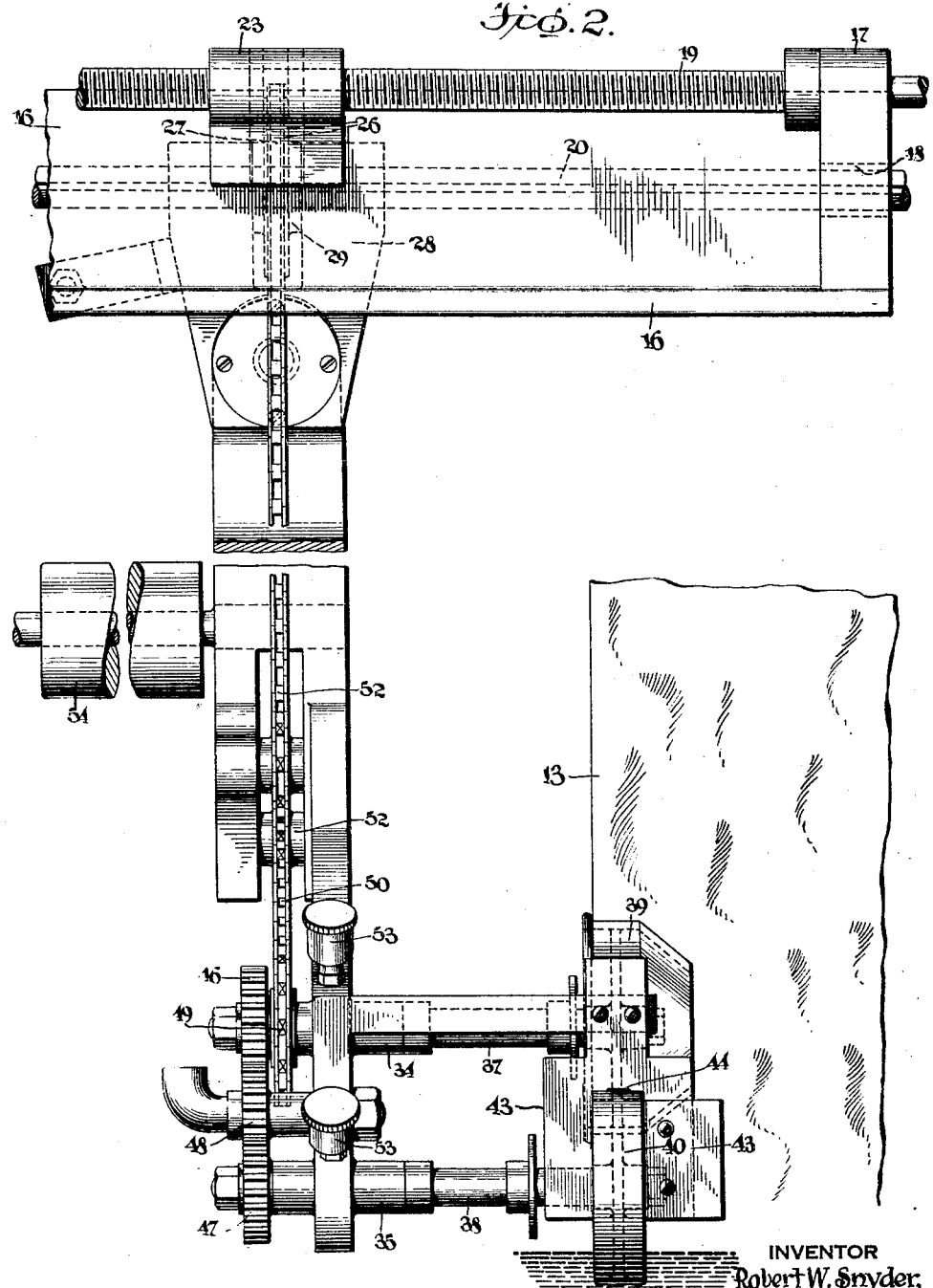

In the accompanying drawings:

Fig. 1 is a sectional view of the exit end of an unwinding machine and a side elevation of a device constructed in accordance with the principles of the present invention; and Fig. 2 is a front elevation of a device shown in Fig. 1 partly broken through the middle portion and on a somewhat larger scale.

In its essentials, the unwinding device referred to above comprises a plurality of power driven rolls 10 supported at either end by a frame 11, the end members of which are held in alignment by spacing bars 12. Rubberized fabric 13 is caused to pass about the power driven rolls in the direction of the arrow and engages a cementing device at a point indicated at 14.

The cementing device is supported from one of the end members of the unwinding machine by a cantilever L-member 16. Near its free end, are two journal members 17 and 18 which support parallel rotatable shafts 19 and 20, the opposite ends of which are housed in journals mounted on the frame of the unwinding device. One of the shafts is provided with a threaded surface and is rotated by means of a hand wheel 22 which is keyed thereto. It is also provided with a threaded sleeve 23 which has two parallel extended fingers 24 and may be moved horizontally along the shaft by merely rotating the latter. The fingers engage opposite lateral portions 26 of a sprocket wheel 27 which is keyed to the other shaft 20. The shaft 20 is splined its entire length and is fitted with a collar member 28 which is freely mounted thereon. The collar is provided with a slotted portion 29 wherein the sprocket wheel 27 is inserted. Power is supplied by a chain 31 and sprocket 32 connected to and rotatable with the upper roll of the unwinding machine.

A member 33 is pivotally suspended from a lower bifurcated portion of the supporting member 28 and is so shaped as to avoid contact with any of the rolls. Two bearing members 34 and 35 are encased in its lower extremity, and are provided with rotatable shafts 37 and 38 respectively. At one end of the upper shaft is a pulley 39 one edge of which is beveled, the other, flanged. The corresponding end of the lower shaft is likewise fitted with a pulley 40 which engages the horizontal peripheral portion of the former. It is partially submerged in a tank 42 of cementing fluid and is surrounded by a guard member 43 which allows only that amount of cement to pass which can be carried through a small vent or notch 44.

The opposite ends of the shafts are fitted with gears 46 and 47, both of which mesh with an intermediate gear 48. In addition, the upper shaft is fitted with a sprocket wheel 49 which is interconnected to the power driven shaft above, by means of a chain 50. The course of the chain is outlined to avoid contact with the rolls by means of a plurality of idler sprocket wheels 52 mounted on the suspending member 33. Grease cups 53 are provided in the bearing to afford satisfactory lubrication. In order to maintain the suspending member in vertical alignment, an adjustable counter-weight 54 is provided which will offset the unequal distribution of weight caused by the moment of the pulleys.

In operating the machine, the horizontal position of the device is so adjusted as to bring the flange portion of the cone pulley 39 in engagement with the edge of the moving fabric. This is accomplished by rotating the hand wheel which in turn causes the extended fingers of the sleeve member 23 to engage the sprocket wheel 26 and shift the device in the appropriate direction. By causing the partially submerged pulley 40 to rotate, sufficient cementing fluid adheres to the rolls to supply the cementing roll, and any excess which can not pass through the notch 44 provided in the guard member 43, must drain back into a storage or supply. The contact made by the two pulley members distributes the cementing fluid over the horizontal surface of the engaging roll. It will be noted that inasmuch as the device is driven by the unwinding machine, it will operate only when the fabric is in motion.

The consistency or composition of the cementing fluid utilized is optional. I have found that although a greater portion of the solvent may evaporate before the ends of the cut strips are joined, the rubber deposit which remains after the evaporation is sufficiently tacky to afford a good union. It is important of course to maintain the cementing fluid at a uniform height. It is likewise important that the lubricated members of the machine be provided with guards in order that they will not come in contact with the fabric.

From the foregoing description, it will readily be realized that the invention may be the subject of a wide number of variations. For example, the device may be provided with an independent source of power, thus obviating drive equipment hereinabove described. It will be appreciated, however, by those skilled in the art that this along with many other changes may likewise be introduced without departing from the scope of the invention, and I desire therefore that it shall be limited only in accordance with prior art and the appended claims.

What I claim is:

1. A cement applying device comprising a horizontally adjustable supporting member having a member suspended therefrom, said member maintaining a rotatable cementing roll and means for wetting the cementing roll in operative relation with a moving sheet of fabric.

2. An adjustable cementing device including rotatable means for supplying a cementing fluid to a moving sheet material and driving means adapted for horizontal adjustment including a sprocket wheel loosely keyed to a power driven shaft to adapt it for horizontal movement and interconnected with the rotatable cement applying means.

3. In a machine for removing liner from rolls of bead wrap fabric and for conducting the fabric to a bias cutter, a device for applying cement to an edge thereof comprising a driven flanged pulley engaging the fabric and in peripheral contact with another pulley partially submerged in a supply of the cementing fluid.

4. In a machine for removing liner from rolls of bead wrap fabric and for conducting the fabric to a bias cutter, a device for applying cement to an edge thereof comprising a driven flanged pulley engaging the fabric, in peripheral contact with another pulley partially submerged in a supply of the cementing fluid and provided with a scraper member having a restricted opening through which the cement adhering to the pulley must pass before reaching the flanged pulley.

In witness whereof, I have hereunto signed my name.

ROBERT W. SNYDER.